J. P. SEXTON.
METHOD OF MAKING PLASTER LATH OR THE LIKE.
APPLICATION FILED MAY 27, 1916.
1,301,513.
Patented Apr. 22, 1919.
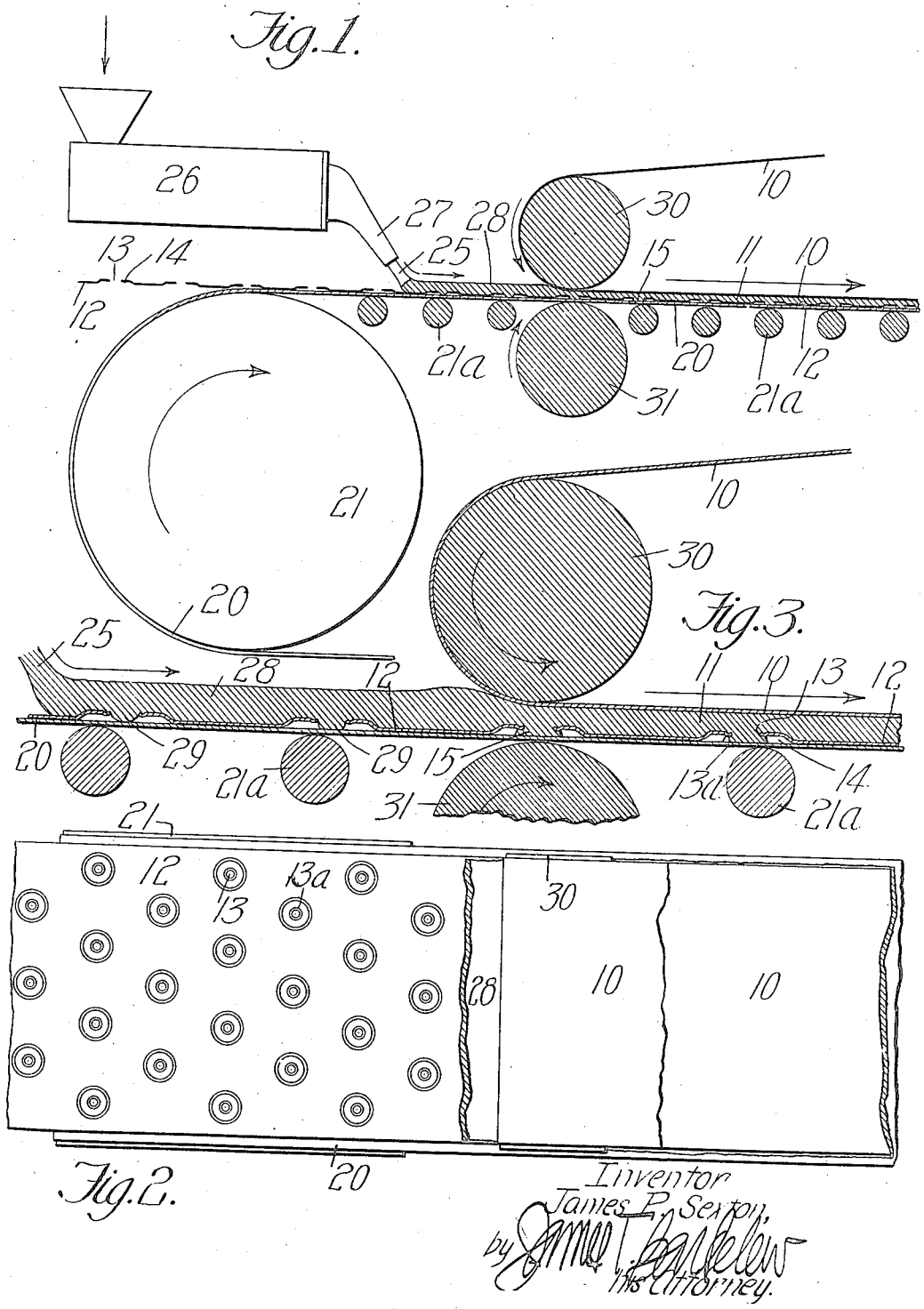

UNITED STATES PATENT OFFICE.

JAMES P. SEXTON, OF LOS ANGELES, CALIFORNIA.

METHOD OF MAKING PLASTER LATH OR THE LIKE.

1,301,513.　　　　　　　Specification of Letters Patent.　　Patented Apr. 22, 1919.

Original application filed June 28, 1915, Serial No. 36,657. Divided and this application filed May 27, 1916.
Serial No. 100,416.

*To all whom it may concern:*

Be it known that I, JAMES P. SEXTON, a citizen of the United States, residing at Los Angeles, in the county of Los Angeles, State of California, have invented new and useful Improvements in Methods of Making Plaster Lath or the like, of which the following is a specification.

This invention relates to a method of making or forming plaster lath or the like; and in this application is in the nature of a division and continuation in part of my application No. 36,657, filed June 28th, 1915, for plaster lath and method of making the same.

It is the particular object of this invention to provide a method of procedure for the expeditious and efficient manufacture of such plaster lath as is shown in my Patent No. 1,115,593, dated Nov. 3rd, 1914, and such as shown in my said application hereinbefore referred to. The nature of my improved method and the details of practice thereof are set forth in the following specification, reference being had to the accompanying drawings in which Figure 1 is a longitudinal section showing the essentials of a preferred form of apparatus for carrying my process into effect, Fig. 2 is a plan of the same, parts being omitted for clarity of illustration, and Fig. 3 is an enlargement of a portion of Fig. 1.

The finished plaster lath made by this process is shown particularly at the right hand portion of Fig. 3. Such a plaster lath embodies a back sheet or form member 10, a body 11 of plastic or cementitious substance, which substance is plastic when the plaster lath is formed, and a facing sheet or form member 12 having spaced apertures 13 surrounded by individual depressions 14. A bead 13ª is formed around each aperture for the purpose of stiffening the sheet at the bottom of the depression so as to support the bottom against the weight of cementitious substance and against the pressure applied. The back sheet may be a plain sheet, as shown, or it may be a duplicate of the face sheet, as is the case when a double faced lath sheet is made. In the finished plaster lath the cementitious substance of the body protrudes through the apertures 13 into the depressions 14 to form protuberances or buttons which are preferably wedge shaped, as shown at 15; and the outer end surfaces of these buttons are in the plane of the facing sheet 12. The depressions 14 surround the buttons, allowing the applied superimposed plaster (which is applied to the face of the finished plaster lath) to enter the depressions and set around the wedge shaped buttons.

The essentials of my method of formation may be stated to be the placement of such a facing sheet as described with its face against a base surface (preferably a flat and smooth surface) with the depressions facing the base surface so that the apertures 13 are spaced from the base surface as is clearly illustrated in the drawings; and the application of the plastic substance in a layer on the upper or back side of the facing in such a manner as to cause the plastic substance to flow restrictedly through the apertures into the depressions to form the buttons as illustrated. In my preferred method of procedure I form the plaster lath in a continuous strip (the comparative width of strip is shown diminished in Fig. 2), and for this purpose I preferably employ a base surface formed by a smooth metal belt which moves horizontally at a suitable speed. The face sheet is fed continuously onto this belt, the plastic cementitious substance is fed continuously in a continuous layer over the facing sheet, and the back sheet is continuously fed onto the layer of substance. Pressure is continuously applied across the width of the layer of plastic susbtance; and the consistency of the plastic substance is such that it is forced through the apertures in the facing sheet and into the depressions and against the surface of the belt by just the right amount to form the buttons.

In the drawings I show a flat metal belt 20 which travels horizontally at a suitable speed in the direction indicated, passing over pulleys or sheaves 21 (only one of which is illustrated). Any suitable means, as shown at 21ª, are employed to support the belt 20 in flat horizontal position. The facing sheet 12 is fed onto the metal belt at the same speed at which the belt travels. In practice, this metal belt is of some considerable length, and the friction, suction and adhesion of the formed plaster board upon the long length of belt are sufficient to hold the plaster lath in place and draw the facing and back sheet along with the belt. The plastic cementitious substance is continuously fed upon the advancing face sheet at 25. In practice I have fed this layer of material onto the sheet in a variety of manners. The material may be delivered onto the sheet from a mixer and may be spread by hand in a fairly uniform layer over the sheet, as the sheet and layer advance, or it may be fed directly from the mixer 26 having a spout 27 of such size and shape that the material is initially fed onto the sheet in a layer of uniform thickness. This layer is shown at 28. The consistency of the material is such that it may partially flow through the apertures 13, as illustrated at 29 in Fig. 3; but the material will not run through the apertures to fill the depressions 14 on account of its consistency and also on account of the fact that air is entrapped in depressions 14. It will be particularly noted that the facing sheet 12 lies flatly upon the smooth flat and preferably polished surface of the metallic belt 20, and that the weight of the layer of plastic cementitious material presses the sheet tightly onto the belt, so that air is entrapped and held in the depressions 14. This entrapping of air between the facing sheet and the flat smooth metal belt is a practical feature of my process which enables the buttons to be most advantageously formed. The backing sheet 10 is preferably fed on over a roller 30 constituting one of a pair of rollers 30—31 between which the belt 20 and all of the constitutent parts of the plaster lath pass during their movement in the direction indicated. The belt 20 rests upon the roller 31, which rotates in the direction indicated, while the plastic material 28 is pressed out into a layer of uniform thickness by the roller 30. Pressure is thus applied by the passing of the plastic material between the two rollers; and the amount of pressure applied depends upon the consistency of the material and upon the amount by which the thickness of the layer is reduced when passing under the roller 30. These conditions are so governed, regulated and maintained that the buttons are uniformly formed in the shape illustrated by the forced flow of the plastic material through the apertures 13 into the depressions 14 and against the surface of the belt 20. Upon being pressed against the surface of the belt 20, the heads or outer ends of the protuberances or buttons are caused to expand, so that the buttons take the wedge or key formation shown in the drawings, and expand in size so as to clench over the edge of the aperture as shown in Fig. 3. I do not mean to say that the button is perfectly circular or that the overhang of the outer part of the button is perfectly uniform; but the buttons are substantially circular and there is a slightly varying overhang all around the button. At the point of complete formation, being the point between the rollers 30 and 31, the plaster lath is formed in its final shape, except for cutting and trimming to size. The continuous strip of plaster lath passes on with the belt for a considerable distance, so that by the time the end of the belt is reached the plastic cementitious substance has sufficiently set to allow the lath to be handled. The continuous strip is then cut to length, and, if necessary, further dried.

When a double-faced lath is being made both the face and back sheets have perforations and depressions. The roller 30 becomes the base against which the back sheet passes, and its surface is then the surface against which the plastic substance is forced to form the buttons. It will be noted that the roller 30 performs all the functions for the back sheet that are performed for the face sheet by the metal belt and the roller 31; the metal belt in addition performing the general function of supporting the formed lath in flat position so as to allow it to at least partially set while so supported.

Having described a preferred form of my invention, I claim:

1. The herein described method of forming plaster lath or the like, embodying placing a sheet having perforations and surrounding depressions on a smooth flat base surface with the depressions facing the surface, applying a layer of plastic substance to the back of the sheet of such consistency that the plastic substance flows restrictedly through the perforations but does not fill the depressions, and then applying pressure to the layer of plastic substance to form it into a layer of uniform thickness and to force it through the perforations to form protuberances in the depressions, substantially as described.

2. The herein described process of forming plaster lath or the like, embodying first forming a facing sheet with perforations and with surrounding depressions, laying said facing sheet face downward on a smooth flat surface with the depressions facing the surface, applying a layer of plastic substance over the back of the facing sheet, said substance being of such consistency as to flow restrictedly through the perforations but not fill the depressions, and then applying pressure to the layer of plastic substance to form it into a layer of uniform thickness and to force it through the perforations and into contact with said surface to form protuberances in the depressions, substantially as described.

3. The herein described method of forming plaster lath or the like, embodying laying a sheet having depressions and communicating perforations on a flat smooth surface with the depressions facing the surface, and applying a layer of plastic substance to the back of the sheet to flow through and fill the perforations; and the engagement of the sheet with the surface being such that air is entrapped between the sheet and surface in the depressions to oppose the flow of plastic substance into the depressions.

4. The herein described method of forming plaster lath or the like, embodying laying a sheet having depressions and communicating perforations on a flat smooth surface with the depressions facing the surface, and applying a layer of plastic substance to the back of the sheet to flow through and fill the perforations; and the engagement of the sheet with the surface being such that air is entrapped between the sheet and surface in the depressions to oppose the flow of plastic substance into the depressions, and applying pressure to the plastic layer to force it through the perforations.

5. The herein described method of forming plaster lath or the like, embodying laying a sheet having depressions and communicating perforations on a flat smooth surface with the depressions facing the surface, and applying a layer of plastic substance to the back of the sheet of such consistency that the plastic substance flows restrictedly through the perforations but does not fill the depressions.

In witness that I claim the foregoing, I have hereunto subscribed my name this 16th day of May, 1916.

JAMES P. SEXTON.

Witness:
   EDWARD H. BARKELEW.